United States Patent [19]

Fischer

[11] Patent Number: 5,348,654

[45] Date of Patent: Sep. 20, 1994

[54] CO-CURRENT PACKED TOWER BIO-REACTOR

[76] Inventor: Harry C. Fischer, Box 14, Moon, Va. 23119

[21] Appl. No.: 112,118

[22] Filed: Aug. 26, 1993

[51] Int. Cl.⁵ .............................................. C02F 3/04
[52] U.S. Cl. .................................... 210/615; 210/151; 210/261; 210/620
[58] Field of Search ............... 210/150, 151, 258, 261, 210/262, 615, 169, 525, 620

[56] References Cited

U.S. PATENT DOCUMENTS

| | | | |
|---|---|---|---|
| 2,200,580 | 5/1940 | Prüss et al. | 210/150 |
| 2,553,228 | 5/1951 | Yonner | 210/151 |
| 3,123,556 | 3/1964 | Gilbert | 210/151 |
| 3,232,865 | 2/1966 | Quinn et al. | 210/150 |
| 3,291,309 | 12/1966 | Hutchison | 210/151 |
| 3,347,381 | 10/1967 | Minch et al. | 210/150 |
| 3,494,463 | 2/1970 | Vermette | 210/151 |
| 3,919,090 | 11/1975 | Shaffer | 210/151 |
| 4,708,792 | 11/1987 | Takarabe et al. | 210/150 |
| 5,084,164 | 1/1992 | Del Rosario | 210/151 |
| 5,085,766 | 2/1992 | Born | 210/150 |
| 5,116,506 | 5/1992 | Williamson et al. | 210/610 |
| 5,190,646 | 3/1993 | Hattori et al. | 210/151 |

*Primary Examiner*—Christopher Upton
*Attorney, Agent, or Firm*—Raymond L. Greene

[57] ABSTRACT

A packed tower bio-reactor having an inlet turbine and a corrugated reactor element is provided. The inlet turbine provides intermittent columns of waste water to the reactor elements thereby permitting alternate slugs of water and air to pass through the reactor element both flowing in the same direction. The reactor media is made up of a roll of single-faced corrugated plastic sheeting and is formed in a packed roll to provide the reactor surface.

8 Claims, 4 Drawing Sheets

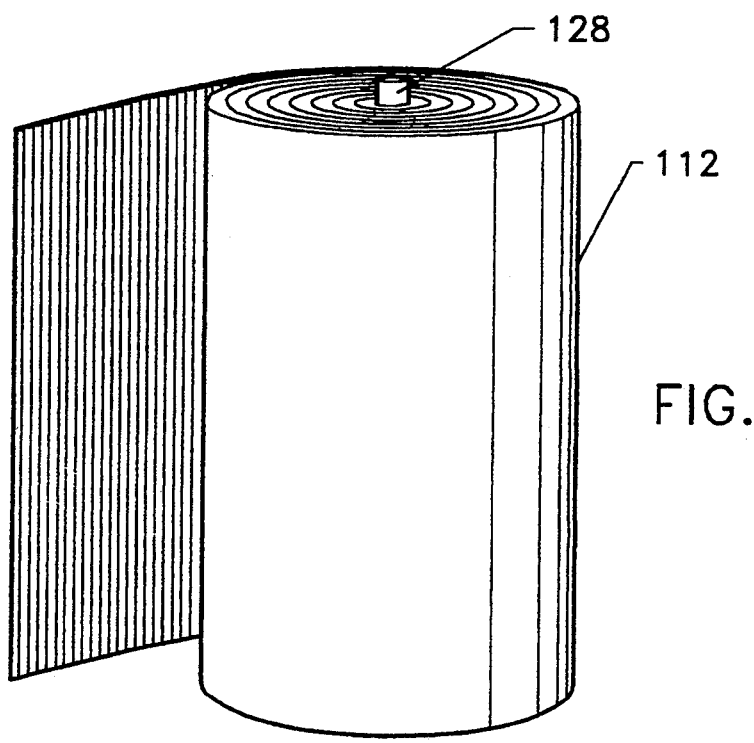
FIG. 5
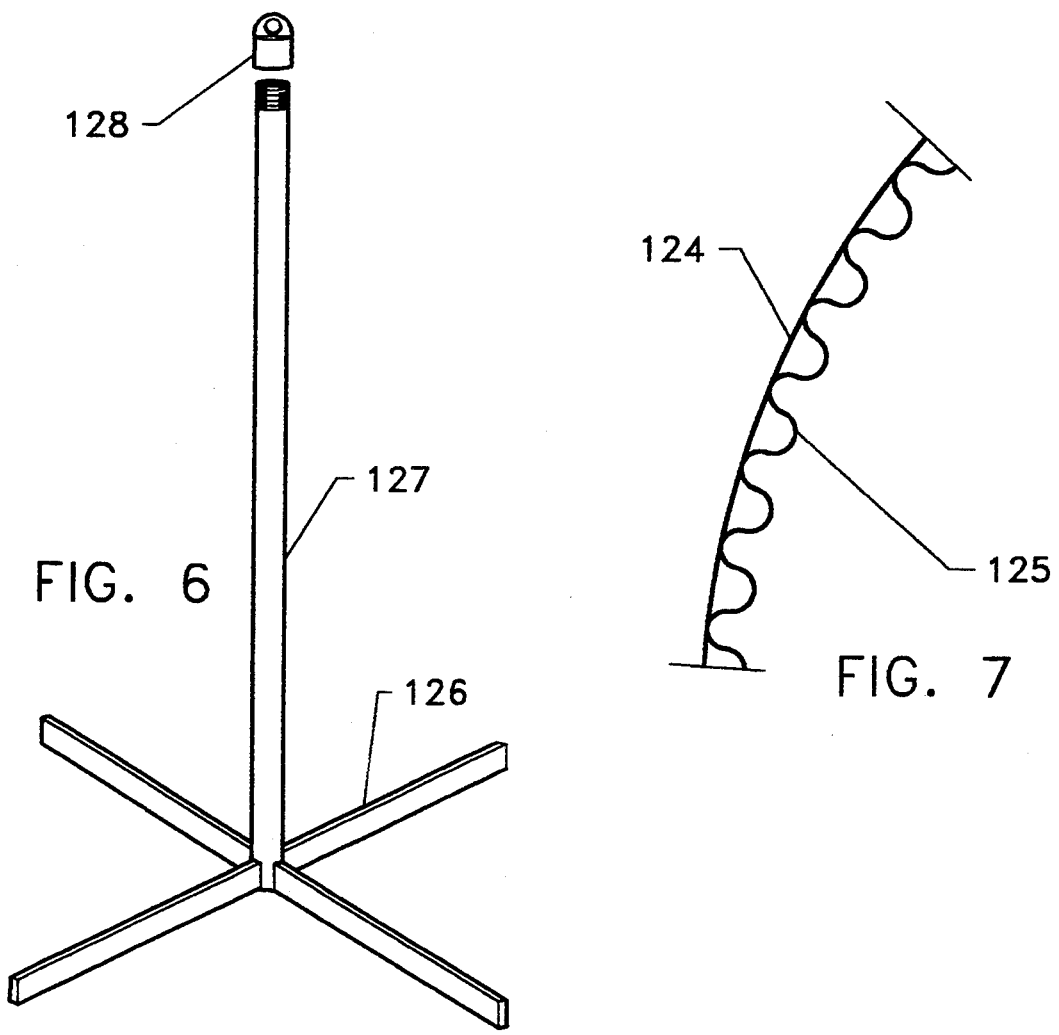
FIG. 6
FIG. 7

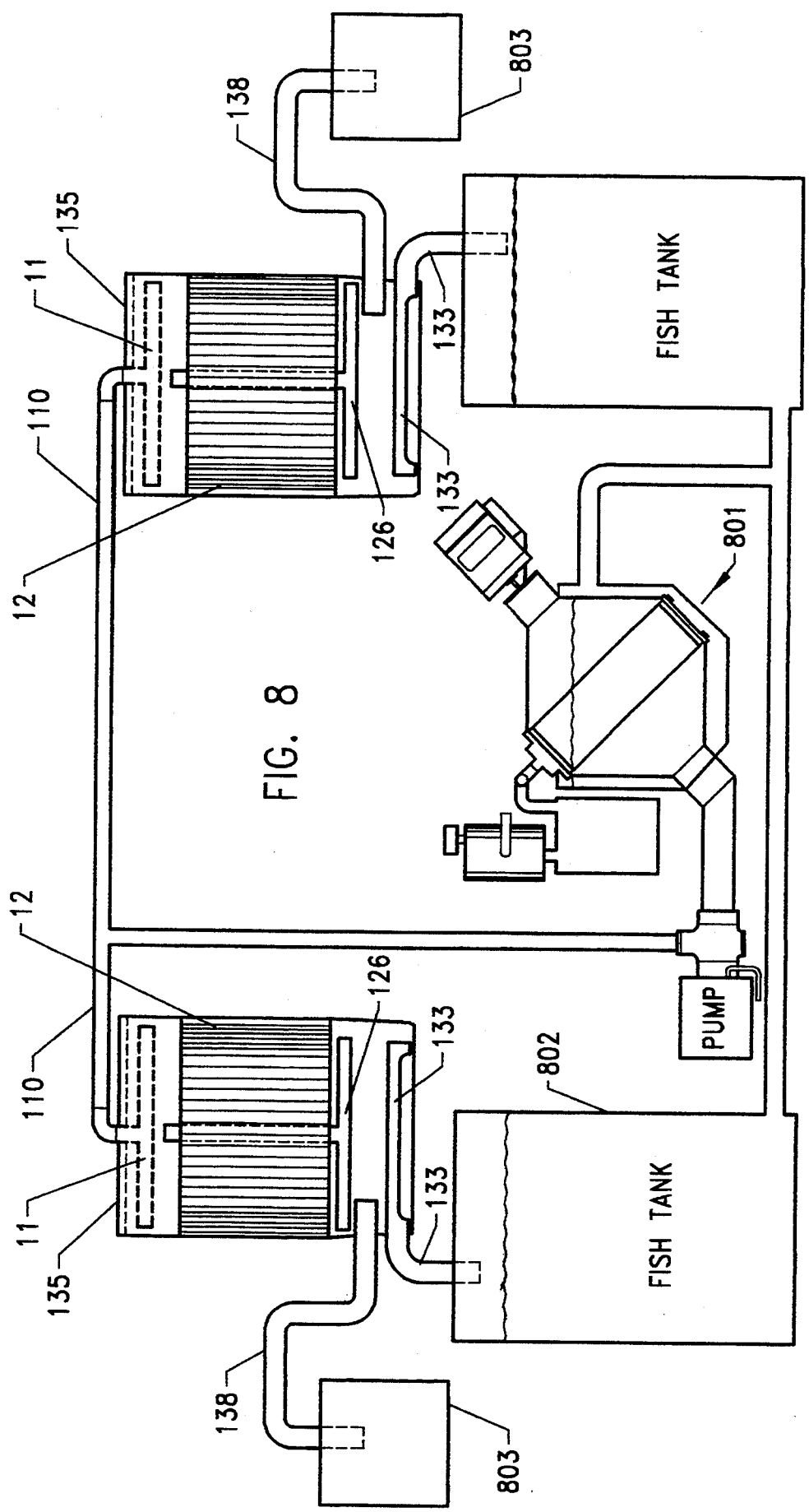

CO-CURRENT PACKED TOWER BIO-REACTOR

BACKGROUND OF THE INVENTION

1. Field of the Invention

This invention relates to the purification of liquids and more specifically to the removal of organic material from water.

2. Description of the Related Art

Biological film treatment processes or bio-reactors are used for effective treatment of organic waste materials. These waste materials include a variety of commercial and industrial discharges, from sanitary wastes to oil and petrochemical spills.

Bio-reactors can be used in a variety of applications, including water purification in fish farms, treatment of water used in food treatment plants, and industrial clean-up water. By ponding such clean-up or waste water mixture, a certain amount of oxidation can be achieved and the chemical oxygen demand (COD) and biological oxygen demand (BOD) of waste water entering the bio-reactor can be reduced. If the necessary nutrients are not already present in the waste water mixture, these nutrients can be added during the ponding phase.

Additionally, storm water regulations now require that contaminated storm water be treated to meet standards before being discarded to recovering streams. Collecting the contaminated storm water and storing it in a pond or lagoon before treatment is recommended so that smaller bio-reactors can be used, thereby reducing the cost, and so that bacteria can be kept active for longer periods. Once treated, ponded water can be used for many commercial purposes such as cooling towers, plant cleanings and process water. By reuse of water, nutrients added to enhance bacterial growth are not lost.

The solids recovered from particulate removal in chicken processing plants can be used as ingredients in chicken feed. Solids not good enough for a feed can be used as fertilizer or otherwise discarded without environmental harm. If oil or fats are present in the waste fluid, a lipophilic surface provides the best contact between bacteria and the oil or fat.

The key component in the bio-reactor is the reactor element. The reactor element must have a large surface in the flow region in order to provide a contact area where microorganisms can live and act on the contaminated material. Two general bio-reactor types have been employed to provide large surface areas in the flow region.

The first type includes the porous diffusion type wherein the discharge solution flows through a porous surface into the interior of a reactor element (as shown and further described in FIG. 3). A porous material, such as sintered diatomaceous earth, provides a tremendously large surface area compared to the volume of material. Using these materials allows construction of reactor elements having very large surface areas. However, while having tremendous surface for bacterial colonies, porous diffusion reactors are, because of the diffusion process, very slow. Waste material, nutrients, and oxygen must all be transported in a liquid solution in order to diffuse into the porous body. Then the processed material and by-products must diffuse outward to the main fluid stream. Additionally, since oxygen, the critical element in aerobic processes, is only slightly soluble in water, a large quantity of water is required to deliver oxygen to the bacteria. For example, at 30° C. water saturated with oxygen can only hold 7.8 lb of oxygen for every 1,000,000 lbs of water. These factors cause diffusion to be a very slow process.

The second type of bio-reactor, commonly referred to as a "bio-deck", uses corrugated sheets of PVC or similar material cemented together at 60° angles, thereby providing a lattice-like structure. Using a bio-deck avoids the problem of low oxygen delivery, since oxygen can be delivered in gaseous form directly to the lattice. Additionally, the slow process of diffusion is avoided by direct wetting of the surface with a contaminant-nutrient solution. However, shortcomings remain with the bio-deck. The structure not only provides less surface than sintered ceramic, but also the "bio-deck" material becomes fouled by bacteria bodies deposited near the intersections of the corrugations. This fouling is caused by the tendency of the flow to take the path of least resistance. At each lattice intersection, disturbances cause slight differences in resistance to flow. The reduced flow, where resistance occurs in any passage, allows dead bacteria to accumulate which further reduces flow. As a result, bio-decks accumulate fouling mass which may be as much as 5–10 times the weight of the original obstruction. This accumulated mass of dead or dying bacteria makes it necessary to shut down the reactor and clean the media to restore operation. Media cleaning is a costly labor-intensive process and incurs additional cost due to equipment being out of service.

Counter-current flow, e.g. liquid flowing downward and air flowing upward, is a popular design for packed tower bio-reactors, but this design presents certain problems. A counter-current reactor typically requires a blower to move the air against the water flow. Secondly, the air will seek the path of least resistance so air will go to paths that have the least water flow, thus defeating the purpose of the tower as previously discussed.

Additionally, when the contamination level is low, as is the situation for fish farm waste water and many types of commercial clean-up water, counter flow systems generally provide an excess quantity of oxygen. For example, a cubic foot of contaminated water with a BOD of 20 ppm would require 0.556 gram of oxygen to reduce the BOD to zero. One cubic foot of air contains 7.33 grams of oxygen or 13 times more oxygen than needed for an equal volume of contaminated water. Despite the excess available oxygen, parts of the bio-deck still lack of sufficient oxygen due to flow patterns which fail to distribute air to all bacterial surfaces.

In any of these systems, the requirements for an effective system are the same. The largest practical surface must be provided which (a) allows microorganisms to accumulate, (b) remains otherwise free of accretion, and (c) has a steady source of both discharge fluid and air.

The typical sequence of purification first requires the removal of particulates. After the particulates have been removed, dissolved material, such as carbohydrates, hydrocarbons, and ammonia, must be converted to non-toxic chemicals, such as carbon dioxide and nitrates or nitrogen. This conversion of dissolved material is generally accomplished by bacteria attached to the surface of tower packing which fills the bio-reactor. The bacterial action produces carbon dioxide and consumes oxygen. The bacteria require a supply of water containing the contaminate. The concentration of contaminants is generally very low, being typically only 1-20 parts per million. In such a case, where one million pounds of water per day may be required to supply the bacteria with one pound of ammonia, it is necessary to have a large flow of water. As an example, a flow of 83.36 gallons per minute for twenty-four hours per day brings one million pounds of water to the bacteria living on the surface of the packing media. Each pound of ammonia ($NH_3$) oxidized to nitrate ($NO_3$) requires five pounds of oxygen in the process. This oxygen requirement means that a large flow of air must also be provided to the bacteria.

SUMMARY OF THE INVENTION

It is an object of the invention is to provide a means of supplying a large surface on which bacteria can live and function.

It is another object of the invention is to supply a large uniform supply of contaminate laden water to the bacterial surface of the reactor.

It is another object to supply air to the bacteria in a volume equal to or in excess of the volume of water supplied.

It is a further object of the invention to provide a regular and uniform air flow to the entire bacterial surface.

It is still another object to provide a means of carrying away the foam formed when the water and air reacts with the bacteria.

It is yet another object to saturate the water leaving the tower with oxygen.

The invention is a bio-reactor tower having a high surface area to volume, self-cleaning media in a packed column. The media is made of 0.0065 inch thick polyethylene or polypropylene flat sheet to which is welded a corrugated sheet of the same material. The component sheets, typically 250 feet in length, are wound around a core and form a cylinder, typically about 24 inches in diameter. The width of the sheet is from 24 to 60 inches wide, thereby providing a cylinder 24 to 60 inches high. Each 12"×12"sheet has a total area (due to the corrugated surface) of approximately 4.7 square feet. Cylinders provide in the range of 2000 to 6000 square feet of bacterial surface area depending on sheet width.

Contaminated water is injected by a rotating turbine into the top of the media and flows vertically downward through the corrugations of the media without encountering mechanical interference. Water is pulled through the corrugations by gravity at sufficient velocity to maintain an accumulation-free surface, but not so great a velocity that live microorganisms are removed. Additionally, the intermittent nature of the waste water injection provides interspersed air spaces between water columns. The combination of water velocity and the dimension of the media flow tubes (corrugations) results in a natural siphon action, thereby providing an interspersed and continual flow of air. Foam formed in the process is separated from the water and led to a separate outlet where it can be broken up and the fine particulate and organics removed.

BRIEF DESCRIPTION OF THE DRAWINGS

The invention together with further objects and advantages thereof, may be more fully understood by reference to the following detailed description taken in conjunction with the accompanying drawings in which:

FIG. 5 is a perspective view of the bio-reactor media of the present invention;

FIG. 6 as a perspective view of the spider assembly which supports the bio-reactor media;

FIG. 7 is an end view of the bio-reactor media; and

FIG. 8 is a schematic of the co-current bio-reactor as applied to a tank for fish farms.

DETAILED DESCRIPTION OF THE INVENTION

Figure 1:
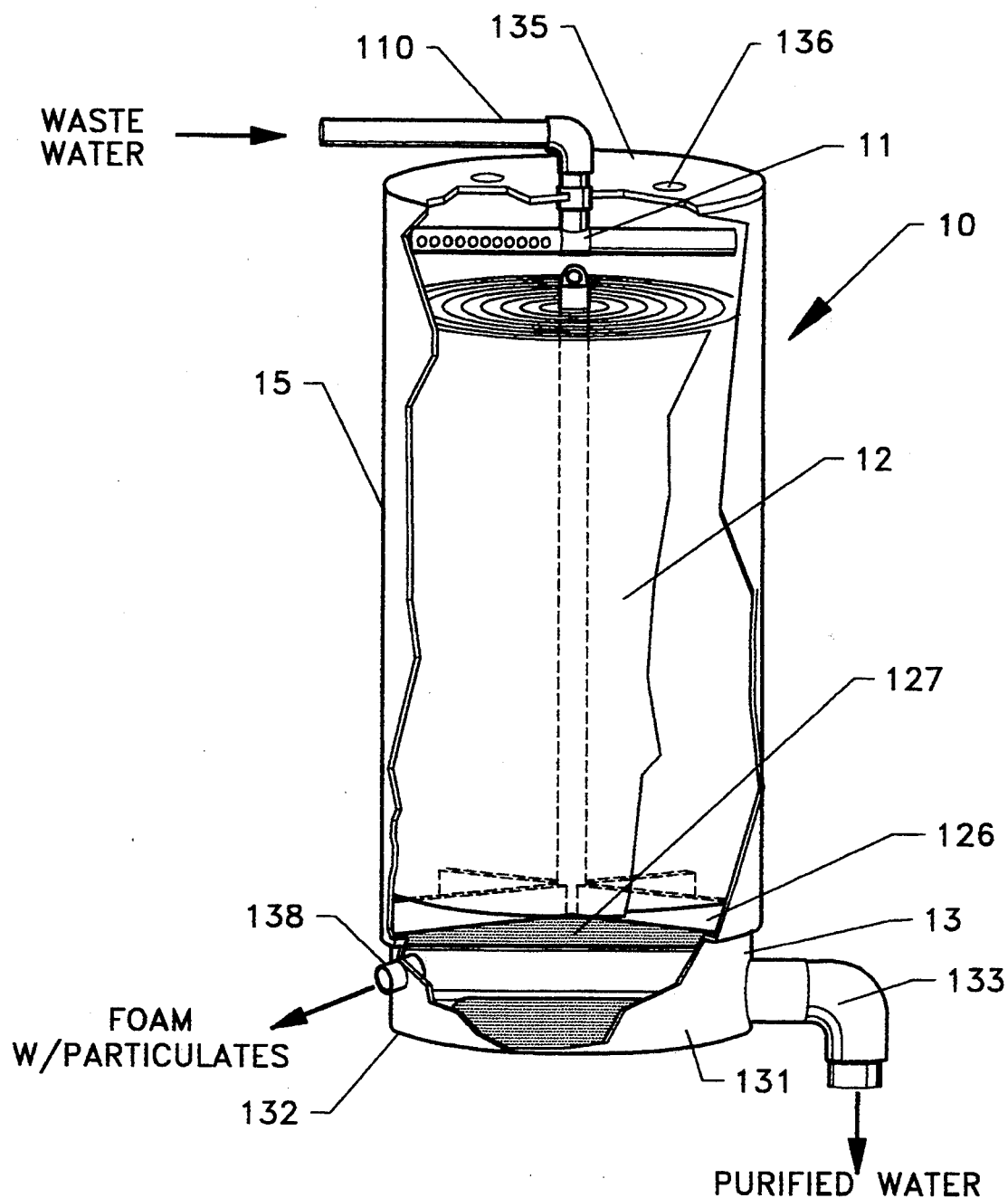
FIG. 1 is a cutaway-section of the bio-reactor assembly.

Referring now to FIG. 1, the co-current, packed-tower bio-reactor (PTBR), designated generally by the reference numeral 10, is shown with its major components. The system comprises a cylindrical enclosure tank 15 containing a water turbine 11, a reactor section 12, and a separation and recovery base section 13. The enclosure tank 15 has a plurality of ports 136 located on upper surface 135. These ports allow air to be drawn into the enclosure tank 15 for use in reactor section 12. Waste water containing contaminants enters the top of the enclosure tank 15 through inlet 110 and then through a rotatable assembly to the water turbine 11. The waste water is sprayed from the turbine 11 into reactor section 12. The rotating turbine causes the waste water to be applied intermittently at any channel on the reactor media. Each channel then receives intermittent columns of water spaced with entrained air. The reactor media is supported by support arms 126, configured to form an "X", and attached to a vertical pipe 127. These support arms rest on a 3-inch PVC plastic pipe 133 which has an opening along the lower surface to admit processed water. As the processed liquid leaves the reactor section 12, aerated foam, containing fine particulate matter, is drawn off through pipe 138.

Figure 2:
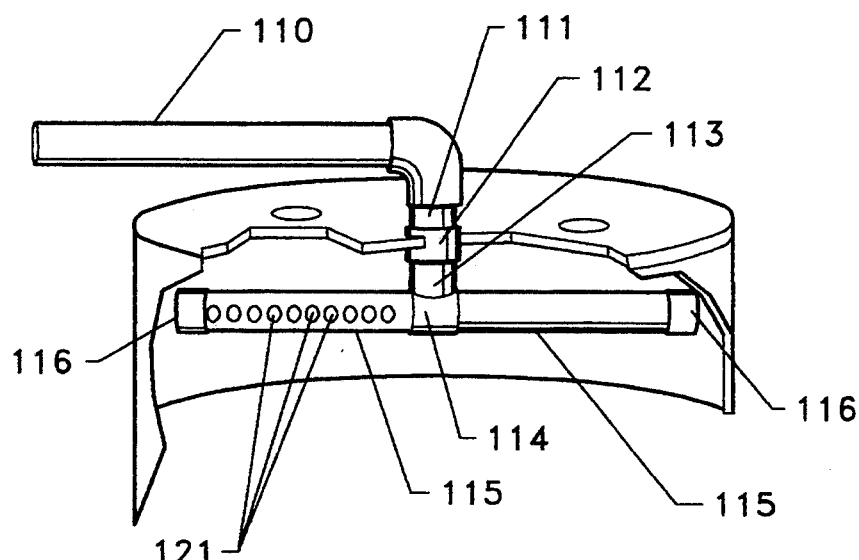
FIG. 2 is a partial cutaway-section showing the water turbine.

As shown in FIG. 2, the water distribution assembly comprises a male pipe adapter 111, a bushing 118, and a shoulder nipple 113 which fits into and is cemented to a tee 114. The tee is fitted with pipe arms, 115 and each arm has water outlets 121. These outlets distribute water evenly over the media bed and at the same time cause the assembly to rotate from the reaction forces of the water leaving the arms. The arms 115 are capped with pipe caps 116.

Figure 3:
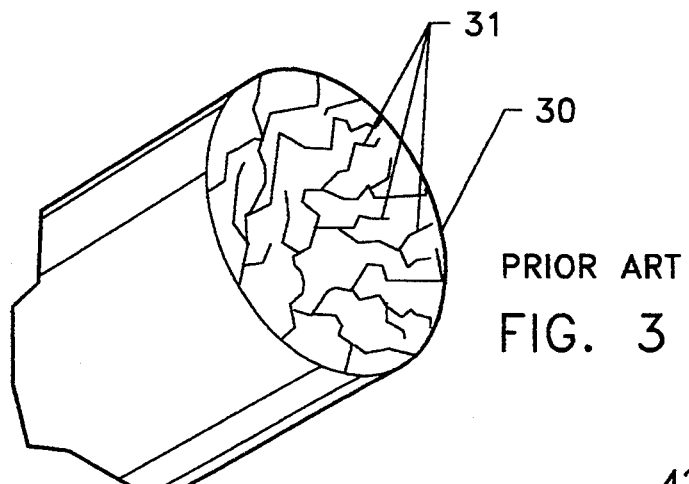
FIG. 3 is a cross-section of a prior art porous bioreactor medium.

Water discharged from the turbine section then enters the reactor media. As discussed in the background section, two general approaches have been used to provide both large surface and sufficient oxygen for the aerobic process which permits the decomposition of oily waste. As may be seen in FIG. 3, one type of prior art structure uses a porous material 30 which provides a tremendous surface compared to volume for bacteria. The bacteria can exist throughout the interior of the material in the porous area represented here by cracked lines 31. Although the surface area is very large, the process remains slow because all reactants must be transported by diffusion of liquid. The transport of oxygen is greatly restricted because only a small quantity can be carried even in an oxygen saturated solution.

Figure 4:
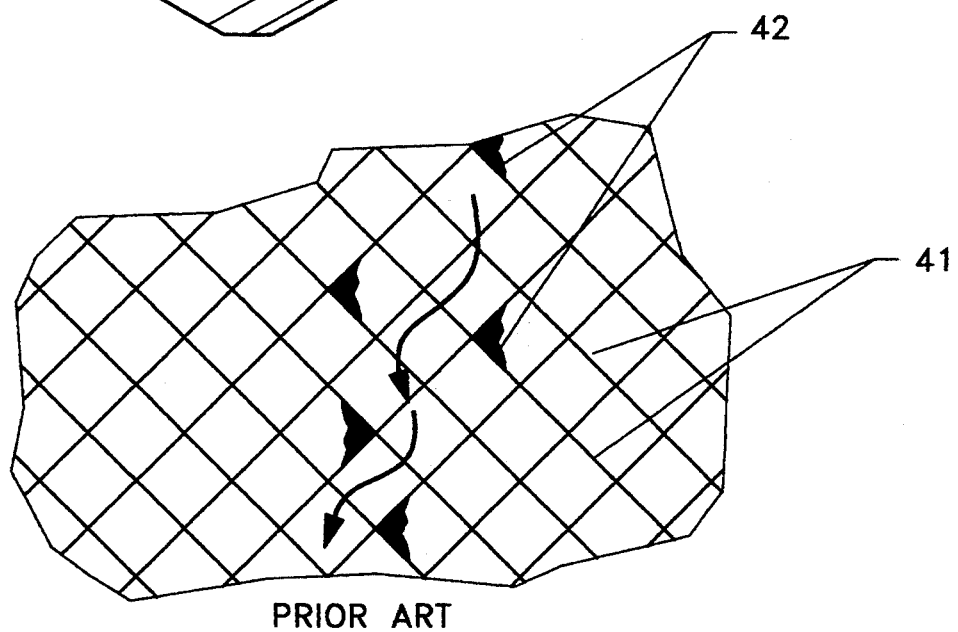
FIG. 4 is a cross-section of a prior art lattice-style bio-reactor medium.

A second type of prior art as shown in FIG. 4 (wherein a lattice-like structure 41 provides much less surface area, but more than sufficient oxygen) also has limitations. In this type, a counter flowing (upward flowing) airstream provides oxidation, but the accumulation of deposits 42 tend to further restrict the already limited surface.

In the present invention, the reactor media has both the waste liquid and the airflow moving in the same direction, i.e. downward. Water is distributed over the entire area of the media by a reaction turbine turning at about 60 RPM. This rotational speed means that 120 times per minute each tube in the corrugated bundle receives a column of water. Because these columns of water act like a free falling piston, they drag behind them air. This volume of air greatly exceeds the volume of water applied to the top end of the corrugated packing cylinder. This water-air-water sequence is an ideal means of providing the bacteria with both food and air while removing $CO_2$. By using the intermittent columns of water to drag in air to the column, no blower is required to make the system function.

As may be seen by reference to FIGS. 5 and 7, the reactor media 112 is formed of commercially available polypropylene sheeting having a corrugated face made of the same material. Various plastic materials may be used, including any poly-olefins, with similarly good results. This single-faced, corrugated material is commercially available in rolls as used in this invention. FIG. 7 shows an end view of the material showing the flat sheet 124 and the corrugated facing 125. The corrugations form approximately $\frac{1}{4}$-inch diameter tubes or channels which receive the columns of waste water. Because the columns are intermittent for any individual channel, air is drawn behind each column of water by siphon action. As a result, intermittent columns of water and air co-currently flow through each channel. This co-current flow is a novel feature of the invention providing unobstructed straight-through liquid flow, thereby avoiding residue accumulation, and providing an excess of oxygen necessary to support the aerobic process, and at the same time providing a greatly increased surface area compared to the volume occupied by the reactor media.

The reactor section 12 consists of a roll of reactor media 112 which is wound onto a three inch PVC pipe. The media 112 consists of a flat sheet 124 of polypropylene about 0.0065 inch thick to which is attached a corrugated sheet 125. The diameter of this roll is approximately twenty-four inches and the height varies from twenty four inches to sixty inches.

As shown in FIG. 6, the reactor media is supported by a spider 126 which is welded to a pipe 127 which is longer than the length of the media cylinder so that the media can be removed from the assembly when and if required. A pipe cap 128 having a lifting point closes the top of the pipe. Pipe cap 128 permits removal of the rector media for cleaning of the bio-tower or cleaning or replacement of the rector media.

A typical embodiment of the invention may be seen in FIG. 8 wherein two bio-reactors are fed by a single filtration system 801. After filtration, water is pumped to inlet 110 where it then enters through the top 135 of the bio-reactor to the water turbine 11. From the turbine, water is sprayed into the reactor media 12 for processing by bacterial action. The processed liquid returns to the fish tank 802 through pipe 133. Foam and any light particulate matter bubbles off through pipe 138 to waste tank 803.

Operation of Co-current PTBR

The packed tower bio-reactor in this invention operates subject to the following constraints and provides the following significant benefits:

1. The contaminates to be removed from water can be at very low concentrations such as 1-5 ppm, and due to the re-circulating of nutrients, operation remains economical.
2. The surface on which the bacteria reside is designed so that the flow of contaminated water can reach the bacteria directly. This design avoids the slow diffusion process for bringing the contaminant to the bacteria as is found in porous plastics and ceramics. If the contaminate must reach the bacteria by diffusion, so must the oxygen and the waste products, thereby reducing the capacity of the PTBR.
3. The supply of air is also directly applied to the bacteria laden surface, not only to supply oxygen, but also to carry away carbon dioxide or other waste products.
4. Mechanically, the water and air reaches the bacteria laden surface with enough energy (velocity) to remove dead bacteria and carry them out of the tower. This feature contrasts to tower fills having reactor media that allow fouling to build up at intersections.
5. In this bio-reactor having media with small direct flow dimensions, counter flow water and air streams cannot be used because of flooding of the media and restrictions to the flow. Co-current flow, as used in this invention, increases the washing action of the air and water over the bacterial surface, thereby reducing any clogging tendency. In the event a path is clogged or restricted, the hydraulic pressure of water in the tube helps flush out the restriction.
6. The water stream is filtered before being pumped into the tower so that large particles cannot clog the entrance to the tubes that form the media reactor surface on which the bacteria resides.
7. The invention recirculates the water stream continuously as contrasted to a trickling filter which must remove up to 95% of the contaminate in one pass. This recirculation conserves nutrients which may be added to enhance microbial action. By continuously circulating the contaminated water, nutrients are also recirculated. This recirculated process reduces the cost of nutrients.

The advantages and novel features of the present invention are numerous. The invention provides a large surface area per volume of reactor media while maintaining a straight-through flow path. The flow path and velocity prevent any residue accumulation on the media surfaces because no corners or stagnant flow areas are present. The intermittent nature of the water columns combined with the flow channel size provides a siphoning action where air and liquid are both drawn through the media channels. The siphoning action provides the necessary volume of air flow to support rapid aerobic bacterial action. Additionally, the co-current flow, that is, water and air flowing in the same direction allows unrestricted flow in contrast to the counter-flow types.

Although the invention has been described relative to a specific embodiment thereof, there are numerous variations and modifications that will be readily apparent to those skilled in the art in the light of the above teachings. In particular, various moving parts may be readily substituted and various substitute plastic materials, such as poly-olefin including polyethylene, polyurethane, and polyvinyl chloride (PVC) may be used without departing from the scope of the invention. It is therefore to be understood that, within the scope of the appended claims, the invention may be practiced other than as specifically described.

What is claimed as new and desired to be secured by Letters Patent of the United States is:

1. A bio-reactor comprising:
    an enclosure having a base;
    a plurality of adjacent vertical tubes located within said enclosure, and a means for supplying water to the tops of the tubes for inducing co-current flow of a gas having columns of water interspersed with entrained air drawn by siphon action of the water within said tubes, said tubes including a bacterially-active surface; and
    means, located within said base, for separating foam from liquid within said enclosure.

2. A bio-reactor as in claim 1 wherein said enclosure comprises a cylindrical tank.

3. A bio-reactor as in claim 1 wherein said means for supplying water comprises a reaction-powered turbine rotatably mounted to the top of the enclosure.

4. A bio-reactor as in claim 1 wherein said bacterially-active surface comprises a roll of single-faced corrugated material having vertically oriented channels.

5. A bio-reactor as in claim 4 wherein said single faced corrugated material is poly-olefin.

6. A bio-reactor as in claim 1 wherein said means for separating comprises a double pipe assembly having a larger lower pipe having an opening along its lower surface which receives liquid and an upper smaller pipe located above the lower pipe which vents air and foam.

7. A bio-reactor for treating contaminated water comprising:
    a base unit having a dual-pipe separation assembly comprising a larger lower pipe having an opening along its lower surface for admitting liquid and a smaller upper pipe located above the level of the lower pipe providing an air and foam vent;
    an enclosure attached to said base unit;
    a rotating reaction turbine attached to the top of said enclosure with variably-sized and spaced outlet ports forming means to provide columns of water interspersed with entrained air drawn by siphon action of the water to a reactor material comprising
    a bacterially-active surface further comprising a roll of single-face corrugated plastic forming vertical passages from top to bottom.

8. A method for purifying contaminated water comprising the steps of:
    providing a pressurized source of contaminated waste water;
    distributing the contaminated waste water in intermittent columns to a plurality of vertical tubes providing a bacterial reaction surface;
    entraining columns of air between the intermittent columns of water whereby said air is drawn through the vertical tubes by siphon action;
    discharging accumulated foam from water exiting said vertical tubes using air pressure generated by said siphon action; and
    collecting purified water.

* * * * *